United States Patent [19]

Sambell

[11] 4,422,828
[45] Dec. 27, 1983

[54] METHOD OF AND APPARATUS FOR INCREASING PROPULSIVE EFFICIENCY OF AIRCRAFT PROPELLERS

[76] Inventor: Kenneth W. Sambell, 3412 Little Rd., Arlington, Tex. 76016

[21] Appl. No.: 310,284

[22] Filed: Oct. 9, 1981

[51] Int. Cl.³ .................... B64C 11/12; B64C 11/40
[52] U.S. Cl. ............................. 416/135; 416/193 R; 416/158
[58] Field of Search ............... 415/140, 141; 416/131, 416/135 R, 134 A, 135 B, 133, 193 R, 204 R, 205, 210 R, 244, 158; 308/2 A, 2 R; 403/57, 58, 74

[56] References Cited

U.S. PATENT DOCUMENTS

| | | | |
|---|---|---|---|
| 727,365 | 5/1903 | Holzmark | 416/205 |
| 4,163,630 | 8/1979 | Weiland | 416/141 X |
| 4,189,283 | 2/1980 | McCoubrey | 416/141 X |

Primary Examiner—Harvey C. Hornsby
Assistant Examiner—Arthur D. Dahlberg
Attorney, Agent, or Firm—Stanley R. Moore; Thomas L. Crisman; Thomas L. Cantrell

[57] ABSTRACT

Hub flexures affording beamwise flapping (i.e. flapping perpendicular to the original tip-path plane), mount aircraft propellers through a hub assembly to a drive shaft of a fixed wing aircraft for increasing propulsive efficiency. The hub flexures permit the propeller blades of the fixed wing aircraft to exhibit advantageous beamwise flapping and reach equilibrium positions in response to loading conditions which would otherwise result in efficiency loss. The flexures permit only flapping perpendicular to the original tip-path plane and provide blade rigidity in radial, in-plane and torsional loading. The propeller blades may also be of the variable pitch variety wherein the flexures are advantageously inboard of the blade pitch change bearings. The flexures further facilitate both passive, or responsive flapping in response to actively induced cylic pitch to achieve maximum propulsive efficiency under any given loading conditions.

5 Claims, 9 Drawing Figures

METHOD OF AND APPARATUS FOR INCREASING PROPULSIVE EFFICIENCY OF AIRCRAFT PROPELLERS

BACKGROUND OF THE INVENTION

The invention relates to fixed wing aircraft propellers and, more particularly, to method and apparatus for increasing propeller efficiency through beamwise flapping. Propeller blades of the prior art have been curved, oriented, flexed and angulated by a myriad of methods and apparatus addressed toward improving propeller efficiency. In conventional systems, the propeller blades are individually mounted for varying pitch control relative to rotation. Other designs have similarly been implemented to improve performance. One such prior art method and apparatus is set forth in U.S. Pat. No. 425,692 issued to D'Aubarede on June 1, 1943. The D'Aubarede patent teaches elastic propeller blade mountings for avoiding or reducing the transmission of vibrations resulting from periodic torques from the power shaft to the propeller blades. It has been recognized to be an advantage to give the propeller limited amounts of freedom in tilting its tip-path plane with respect to the power shaft axis. Such "maneuvering" avoids the stresses resulting from the propeller blades passing in front of a wing or any other obstruction to the flow of air. Similarly a lack of balance between the blades, and gyroscopic torques caused by the oscillations of the power shaft axis are stress contribution factors and equally elements of concern. It may be seen, however that elastic mountings permit the propeller blade to oscillate in any direction with respect to the power shaft axis. This subject invention notes however, that beamwise deflection rather than radial, in-plane or torsional deflection is the key advantage of blade flexibility. Torsional flexibility may actually decrease propeller blade efficiencies in periods of maximum loading such as during take-off and high-speed cruise. The provision of high mechanical strength in the torsional and/or radial plane is thus necessary for maximum utilization of propulsive capacity of any system design.

Prior art approaches to propeller assemblies have also addressed hub mounted, flexural elements and propeller blade-shaft combinations. Most often emphasis on the variable-pitch, cyclic control aspect of propeller/rotor driven aircraft has been toward helicopters rather than fixed wing aircraft. Such applications of the aforesaid assemblies have always been used for flight control and to relieve structural loads in the propeller blades, hub and shafts. This invention uses these elements to increase propeller thrust and thereby increase propulsive efficiency. It has been found to be desirable to provide blade tilt assemblies for fixed wing aircraft to maximize and/or direct propulsive thrust. In such a manner, the propulsive effect of the propeller may be selectively utilized to meet certain flight conditions. For example, lateral and vertical deflection of propeller wake by the utilization of "vanes" is set forth in U.S. Pat. No. 1,289,343 issued to A. Wolff, Jr. on Dec. 31, 1918. In the Wolff patent, a plurality of vanes have been arranged at an angle to the longitudinal axis of the airplane to operate in conjunction with the propellers to produce a select forward pressure. In the Wolff structure currents from the propellers strike the vanes at an angle and thereby exert a pressure which ostensibly accelerates the forward movement of the airplane.

It may be seen that directing propeller wakes and tilting propellers is thus not a new concept. Various "wake" characteristics of propeller driven aircraft have been considered by the prior art. Most conventional design considerations are addressed, in the main, by variable pitch propeller blades. However, lift-drag coefficients play an important part of increasing any propulsive efficiency. The angle of attack of a rotating propeller blade is, in particular, a critical aspect of efficiency and overall performance. Moreover, a small increase in propeller efficiency of but a few percent will reduce fuel consumption of the aircraft, which in the present energy shortage, is a most important consideration in aircraft design. Modern fixed wing aircraft must, therefore, take such design aspects into consideration.

A variety of functional mechanisms have been set forth in the prior art for orienting and angulating propeller blades of both fixed and rotational wing aircraft, for flight control. In the main, the gyroscopic, accelerative, and drag effects of the propeller blades have been of tantamount concern. U.S. Pat. No. 3,799,695 issued to Eiichi Yamakawa on Mar. 26, 1974 sets forth a rotor control system having variable pitch rotor blades and a swashplate system which is controlled by the pilot's control stick. The amount of longitudinal cyclic pitch change induced by the longitudinal control stick operation is decreased as the forward flight speed increases and concurrently the lateral cyclic pitch change is automatically reduced.

Cyclic pitch control of propeller blades has thus been effected, and comprises an important aspect for control of rotary wing aircraft.

Concomitantly, certain aspects of propeller blade flapping have been implemented as shown in disclosures addressing helicopter flight. U.S. Pat. No. 2,509,313 issued to C. G. Pullin on May 30, 1950 sets forth such a method of achieving the advantage of a large ratio of pitch change for small flapping displacements of the propeller blades. The Pullin patent sets forth a gimbal ring and offset flapping hinge for rotary wing aircraft. The advantages of such flapping and propeller wing control have not, however, been particularly utilized to date for fixed wing aircraft.

Fixed wing, multi-propeller aircraft of conventional design are generally certified to achieve a specified rate of climb at a specified climb speed with one propeller inoperative. This is particularly critical for aircraft with only two conventional propellers installed. Once one propeller has failed, there is only one operative thrust developing means for propelling the aircraft. Such a propeller has two distinct areas in its tip-path plane (propeller disc). The first region is the down-side area in which the blades rotate substantially downward through a horizontal plane (drawn through the center of the propeller hub). The second region is the up-side area in which the blades rotate substantially upwards through the horizontal plane. For conventional propellers in flight with their axis of rotation at typical angles of 5 to 15 degrees above the vector of the free stream velocity, and when flying at the specified climb speed, the majority of the propeller thrust is produced on the down side of the propeller disk. On the up side, the blades are producing much less than their design capability. It may thus be seen that the propeller blades are experiencing a "cyclical change" in an angle of attack and relative airspeed during each hub revolution. Because conventional propellers have essentially rigid blade-hub attachments, the aforesaid thrust dissymmetry occurs. The overall center of thrust of the propeller, in this condition, occurs 5-25% of blade radius, on the down side. It would be an advantage therefore to incorporate means within the propeller to permit flapping in a direction perpendicular to the original tip-path plane. This motion is referred to as beamwise flapping. Such a method and apparatus is provided in the present invention, wherein a hub flexure allows each blade to develop beamwise flapping velocities which reduce the cyclical angle of attack change and hence produces a more even thrust distribution around the propeller disc. While providing beamwise flexing, the assembly is relatively stiff within the plane of rotation and in blade torsion, which prevents in-plane instabilities and blade flutter. In this manner propulsive efficiency of fixed wing aircraft is greatly increased.

SUMMARY OF THE INVENTION

The invention relates to a method for improving the propeller efficiency of fixed wing aircraft, which method includes providing beamwise flapping of a hub mounted propeller array. More particularly, one aspect of the invention comprises a method of improving propulsive efficiency for fixed wing aircraft of the type wherein a propeller blade is mounted to an aircraft engine for generating thrust. The improvement comprises the steps of providing a flexible hub array of the type permitting beamwise flapping, and retaining blade in-plane and torsional rigidity. The flexible hub array is fixedly mounted to the propeller engine. The propeller blades are secured to the flexible hub array outwardly of the flexible members. The flexible hub array and propellers are then rotated while permitting beamwise flapping in response to non-uniform wind loading of the propeller.

In another aspect, the invention includes an improved aircraft propeller assembly for fixed wing aircraft of the type comprising an array of propeller blades secured about a propeller drive shaft driven by an engine secured to the wing of an aircraft. The improvement comprises a beamwise flapping flexure array secured radially about the drive shaft for providing beamwise flapping relative to the drive shaft and blade torsional and in-plane rigidity relative thereto. A cylindrical hub is flexibly mounted to the flexure array symmetrically around the drive shaft. The propellers are mounted symmetrically to the hub, and the flexures are constructed for permitting beamwise flapping of the hub and propeller array in response to non-uniform wind loading of the propellers. In yet another aspect of the invention, the hub is mounted to the flexure by a pivot pin joint having a longitudinal axis of symmetry substantially within the plane of rotation of the flexible link and tangential to a circle drawn in the plane.

BRIEF DESCRIPTION OF THE DRAWINGS

For a more complete understanding of the present invention and for further objects and advantages thereof, reference may now be had to the following description taken in conjunction with the accompanying drawings, in which.

DETAILED DESCRIPTION

Figure 1:
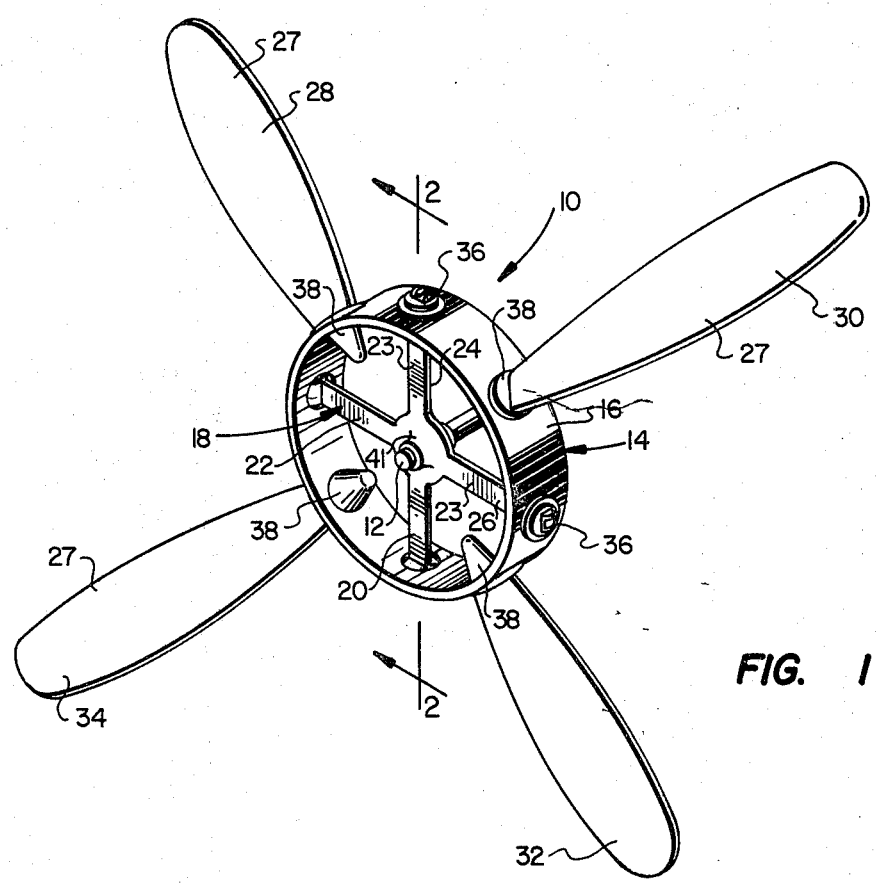
FIG. 1 is a perspective view of one embodiment of an aircraft propeller assembly incorporating the principles of the present invention.

Referring first to FIG. 1, there is shown a fragmentary perspective view of one embodiment of an aircraft propeller assembly 10 incorporating the principles of the present invention. A conventional propeller shaft 12 is shown connected to a hub-flexure array 14 which includes an outer cylindrical ring 16 and inner flexure network 18. The flexure network 18 includes, in the present embodiment, four radial struts 20, 22, 24 and 26. The radial struts are hereinafter referred to collectively as struts 23. Propeller blades 28, 30, 32 and 34 are disposed about the hub 16 in a symmetrical pattern therearound. The propeller blades are hereinafter referred to collectively as propeller blades 27. In this configuration, the hub-flexure array 14 affords beamwise flapping of the propeller blades 27 in response to wind loading conditions. The aforesaid beamwise flapping will herein be shown to advantageously increase the propulsive efficiency of the aircraft and maximizes the effectiveness of the propeller 27.

Still referring to FIG. 1, there is shown a series of flexure mounting members 36 securing each flexure struct 23 to the hub 16. The mounting member 36 affords movement between the flexure strut 23 and hub 16 during beamwise flapping. Rotation of the array 14 and propeller blades 27 is provided by the propeller shaft 12. The shaft 12 may be seen to rotate the flexures struts 23 while beamwise flapping occurs relative thereto. It may be further appreciated that the flexure struts 23 permit only flapping, or movement, perpendicular to the original tip-path plane comprised of that plane of rotation created by the shaft 12.

It is conventional for fixed wing aircraft for the propeller blades 27 to be of a variable pitch variety. The flexure network 18 is thus positioned inboard of the pitch change bearings normally provided with such variable pitch assemblies. Consequently, each propeller blade 27, as herein shown, is mounted to the hub 16 through a pitch change bearing 38 for affording relative rotation between the propeller blade 27 and the hub 16.

Figure 2:
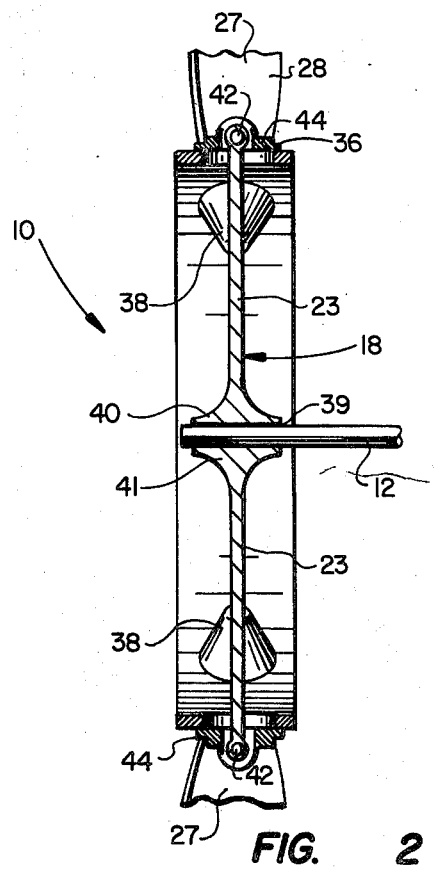
FIG. 2 is a side elevational, cross sectional view of the propeller assembly of FIG. 1 taken along lines 2—2.

Referring now to FIG. 2 there is shown a side elevational cross sectional view of the propeller assembly of FIG. 1 taken along lines 2—2 thereof. The assembly 10 as shown illustrates the reduced lateral thickness of the flexure struts 23 which affords beamwise flapping. The struts 23 may be constructed of laminated steel plates or laminated, advanced composite materials. The driving propeller shaft 12 is centrally received within an aperture 39 of a hub mount 40 of the flexure network 18. The hub 40 is formed with an elongate central body portion 41 and the flexure struts 23 extend radially therefrom. It should be appreciated that various radial flexure arrays may be constructed in accordance with the principles of the present invention and the specific cross sectional configuration of FIG. 2 is shown for illustrative purposes only.

Further shown in FIG. 2 are the propeller blades 27 radially extending from the hub-flexure array 14. Each flexure strut 23 is secured to the outer hub 14 by means of a flex-mounting bearing 36. Each mounting bearing 36 comprises a shaft 42 received through the end of the flexure strut 23 which shaft is mounted within an outer bearing retention plate 44 which secures the hub 16 relative to the flexure strut 23. The inner-most portion of the bearing plate 36 may incorporate a conventional tapered roller bearing or an elastomeric material (not shown) connected to an inner bearing retention plate (also not shown). What is shown is a diagrammatical expression of a preferred mounting of a hub 16 to a flexure array 18 for affording beamwise flapping of propeller blades 27.

Figure 3:
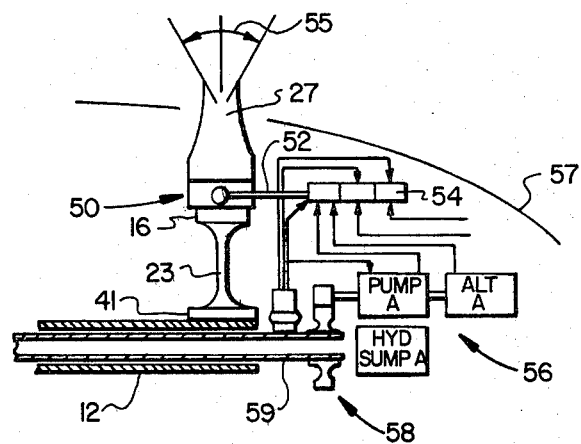
FIG. 3 is a diagrammatic schematic of one embodiment of the invention of FIG. 1.

Referring now to FIG. 3, there is shown a diagrammatic schematic of a bladepitch control system incorporated into the invention of FIG. 1. Propellers 27 are shown, diagrammatically, to be mounted to outer hub 16, flexibly coupled to flexure strut 23 which is in turn mounted to drive shaft 12. The propeller blades 27 of FIG. 3 are shown to be of the variable pitch variety wherein a blade pitch control mechanism 50 secures the position of each blade 27 to the hub 16 through the bearing 38. A blade pitch control shaft 52 is coupled to a triple piston actuator 54 which may be seen to be connected to electro-hydraulic systems 56 which are in turn responsive to pick-up sensors 58 secured to a stand pipe 59 relative to the drive shaft 12 of the propeller 27. Each blade 27 is therein controlled by one of the triplex hydraulic actuators 54 through the respective control rod 52. Each piston of the actuator may have a separate electrical and hydraulic power and signal supply as shown. The hydraulic and electrical supply is generated and completely contained in the rotating system outwardly defined by a spinner 57. The drive is via a non-rotating standpipe 59 which is diagrammatically shown. Such blade pitch control systems are conventional in the prior art and are shown herein for purposes of reference and discussion as to the efficiency afforded by the present invention.

The propeller drive and control configuration shown in FIGS. 2 and 3 illustrates the "inboard" position of the flexure array 14. With the flexure struts 23 inboard (i.e. closer to the drive-shaft axis) of the blade pitch change bearings 38 angulation of the hub 16 and consequently beamwise flapping of the propellers 27 perpendicular to the plane of rotation is permitted. As set forth above, the flexure 23 is relatively stiff in the plane of rotation and has a first critical frequency of 0.5–1.5 per revolution. The blades are further stiff in torsion to preclude blade flutter. The result is flapping up to plus or minus 12 degrees, as shown by arrow 55, and a pronounced increase in propulsive efficiency, as will be described in more detail below.

Figure 5:
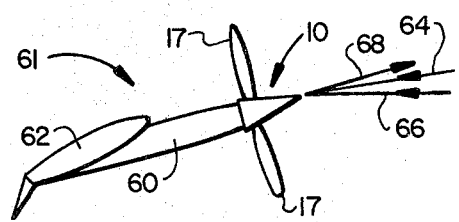
FIG. 5 is a diagrammatic, side elevational view of a propeller assembly and inflow angle at take-off.

Referring now to FIG. 5, there is shown a diagrammatic side elevational view of a propeller assembly at take off where non-axial flow occurs. A typical inflow angle is shown for an engine 60 outboard a wing 62. The free stream flow is shown by arrow 64; inflow of air is shown by arrow 66, which includes wing upwash; and the axis of rotation of the propellers 17 is shown by arrow 68. This non-axial flow of air through the propeller system produces efficiency losses which are the subject of the present invention. By employing the hub flexure array 14 of the present invention, the propeller blades 17 are allowed to develop beamwise flapping velocities which are perpendicular to the original tip-path plane. This affords improved thrust distribution around the propeller disc and improved propulsive efficiency. This efficiency is provided whenever the airflow 66 is non-axial. As manifested in FIG. 5, this may occur during flight with one of the propellers inoperative, or at high rates of climb as in takeoff, or at loiter conditions.

Figure 4:
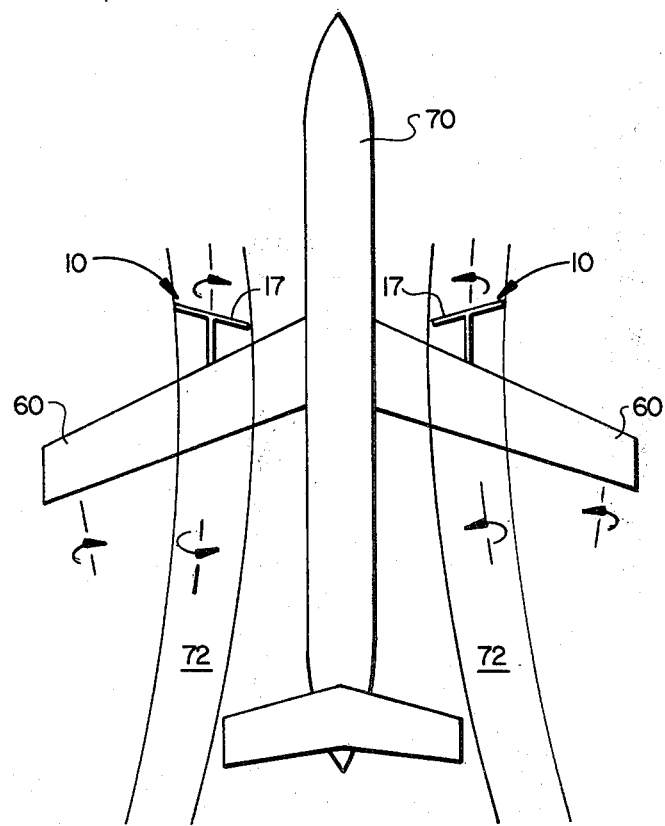
FIG. 4 is a diagrammatic top plan view of a fixed wing aircraft incorporating the method and apparatus of the present invention.

Referring now to FIG. 4, there is illustrated an additional advantage of the present invention. By inducing lateral cyclic pitch in combination with the hub-flexure array 14, the wing tip vortices normally associated with such aircraft 70 may be deflected outwardly and/or destroyed. This is provided by deflecting the thrust vectors of the propellers 17 to cause the propeller wash 72 to angulate outwardly from the tail of the aircraft in such a manner as to carry outwardly the wing tip vortices. Such an end result of lateral cyclic pitch induced by the aircraft controls may increase the effective wingspan and thereby increase the climb efficiency. It may also improve crosswind landing efficiency by developing side forces and compensate for necessary angle of bank or crab during landing procedures. Such control may further permit the aircraft to be more versatile in its operation as well as more fuel efficient.

Figure 6:
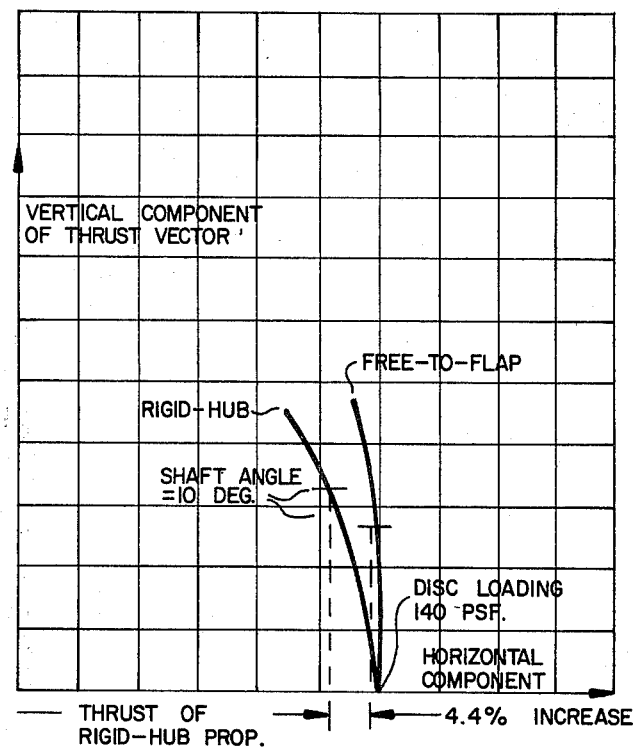
FIG. 6 is a graphical illustration of analytically derived thrust increase afforded by utilization of the principles of the present invention.

Referring now to FIG. 6, there is shown a graphical illustration of analytically derived data of the thrust increase afforded by utilization of the principles of the present invention. The analysis is analytical and examines propulsive efficiency of a rigid hub propeller of the prior art variety and the flapping array of the present invention. The shaft angle of attack is from 0 to 15 degrees. The analysis assumed a uniform induced velocity across each propeller disk. At each shaft angle, the blade pitch for each propeller 17 was adjusted to a power constant in the computations. The location of the resultant vectors are set forth in FIG. 6. At any non-axial shaft angle, the flapping propeller of the present invention produces more thrust than the rigid hub propeller. For example, at 10 degree shaft angle the flapping propeller produces 4.4% greater horizontal thrust than that for the rigid hub propeller.

Figure 7:
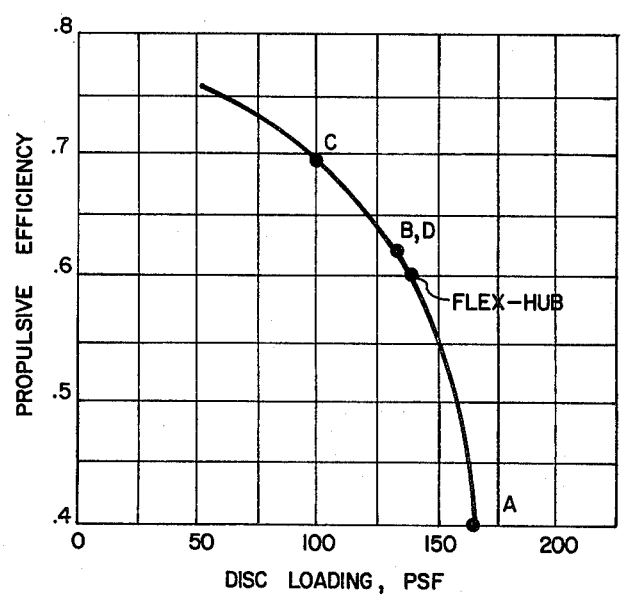
FIG. 7 is a graphical illustration of a typical propeller efficiency curve.
Figure 8:
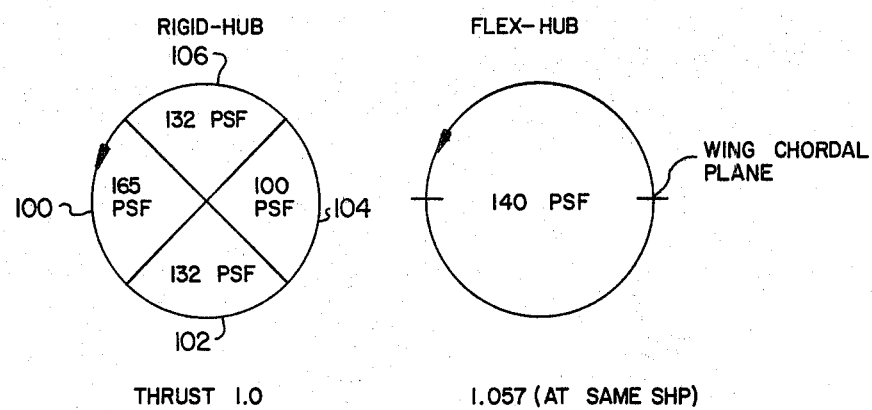
FIG. 8 is a comparative diagrammatical illustration of disc loading distribution between the prior art structure and the present invention.

Referring now to FIGS. 7 and 8 in combination, there is shown graphical illustration of a typical propeller efficiency curve and a comparative diagrammatical illustration of disc loading distributions between the prior art structure and the present invention. The analysis again is analytical and is used to analyze the distribution of propulsive efficiency with non-uniform, non-axial inflow. Absolute disk loading was held constant. Each blade 17 was analyzed every 15 degrees around the tip plane. Local induced velocity at each blade element was iterated verses local angle of attack until they were balanced. The disc loading (thrust divided by area) for the down blade quadrant 100 (45 degrees of azimuth, either side of the wing) and the up blade quadrant 104 was then calculated. At a shaft angle of 15 degrees, a ratio of 2.3 to 1 was calculated. This compares reasonably well with conventional analyses for rigid hub propeller designs having a ratio of 2 or 3 to 1 at shaft angles of 15 to 20 degrees, with inherent blade flapping of about 2 degrees. At an angle of 10 degrees, a ratio of 1.65 to 1 was calculated. The ratio was then applied to estimate the difference in overall thrust between a flex-hub prop-fan wherein the disc loading is estimated to remain uniform and a rigid-hub prop-fan. A typical propeller efficiency curve of FIG. 7 was used in this iteration. The resulting disc loading distribution is shown in FIG. 8. The down blade quadrant 100 increased its disk loading to 165 PSF from a basic 140 PSF. To maintain constant power, the collective blade pitch was reduced from that of the flex-hub 14 and quadrants 102 and 106 have a disc loading of 132 PSF (essentially equal since wing upwash does not change their blade angles of attack). The up-blade quadrant 104 reduced its disc loading to 100 PSF, again relative to the basic 140 PSF. Each quadrant's propulsive efficiency is shown in FIG. 7. The overall power is the same and the flex hub prop fan of the present invention is estimated to develop 5.7% higher thrust than a rigid hub prop fan flapping about 2 degrees. The thrust center for the rigid prop fan is offset 7.6% radius laterally, on the down blade side in the calculation. This is thought to be conservative by the inventor. The disc loading in quadrants 100 and 104 were also used to estimate the slip stream dynamic pressure over the wing 62 of the aircraft. Quadrants 102 and 106 theoretically do not touch the wing and their effect was neglected in the analysis.

Figure 9:
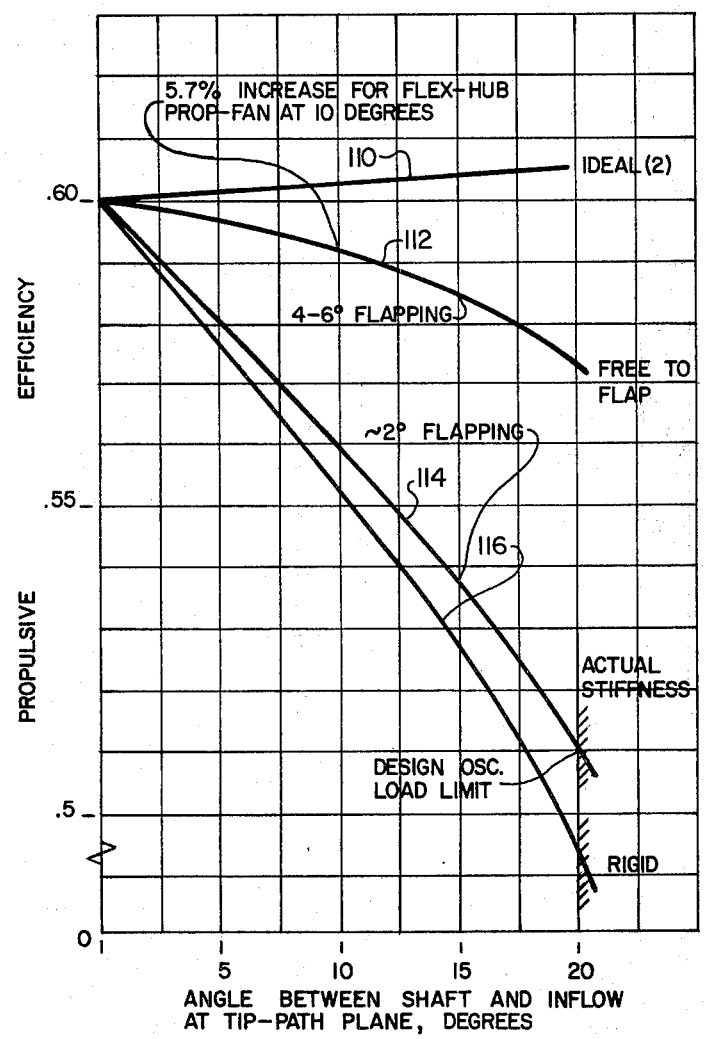
FIG. 9 is a graphical illustration of the increased propulsive efficiency between the method and apparatus of the present invention and that of the prior art.

Referring now to FIG. 9, it may be seen that this method of analysis is used to illustrate the difference in propulsive efficiency between a flex-hub prop-fan of the present invention and conventional rigid hub prop fans of the prior art. This analysis is made for non-axial flow at take off. The curves set forth in FIG. 9, also analytically derived, shows an "ideal" propeller 110, a flex-hub propeller of the present invention 112, a rigid hub propeller 114, of the prior art variety, and an infinitely rigid propeller 116. The propulsive efficiency set forth is based on resolving axial and inplane forces on an axis half way between the shaft and the angle of inflow. All four curves begin at a propulsive efficiency of 0.6 in axial flow. This is considered to be typical for disc loadings of 140 to 150 PSF and a tip speed of 800 ft/sec. The ideal rotor 110 is assumed to have, for shaft angles up to 20 degrees, uniform induced velocity, no increase in profile power from axial flow, and no inplane force.

Still referring to FIG. 9, the propeller with actual rigidity is shown with its propulsive efficiency 116 falling quite steeply to 0.537 at 15 degrees. At 20 degrees, conventional propeller designers find that the oscillatory loads typically reach high values which usually force the design of blade stiffness and blade weight. Blade flapping is about 2 degrees, which provides some relief from the infinitely rigid case. The free-to-flap or flex-hub propeller 112 flaps 4 to 6 degrees, at a shaft angle of 15 degrees and improves propulsive efficiency by 8.75%, and by 5.7% at a shaft angle of 10 degrees. This substantially approaches the "ideal" propeller 110. There is no established figure as to the flapping angle in the presence of wing upwash. However, should the flex-hub prop-fan fail to develop sufficient beneficial flapping, longitudinal cyclic pitch can be introduced to more fully achieve the desired condition of unloading the advancing (or downward) blade and loading up the retreating (or upward) blade. The hub-flexure array 14 will then provide tolerance to the required cyclic pitch and provide a "softer" prop-fan (i.e. a softer ride for the passengers) over a given range of non-axial flow.

Thus at the selected shaft angle of 10 degrees the flex hub array 14 in a prop-fan is predicted to provide a propulsive efficiency along the flight path of 0.592 at take-off thrust vs. 0.56 for a conventional rigid hub prop-fan. This relatively small difference has never been particularly noticed or researched in the prior art. But at power levels of 10,000 to 30,000 shaft horse power, it provides a significant thrust difference and a significant propulsive lift difference.

It may be seen that the present invention affords increased propulsive efficiency by permitting beamwise flapping of the propellers 17 relative to the drive shaft 12. Flapping is provided through the hub-flexures array 14. Each flexure (strut 23) allows the blades 27 to develop beamwise flapping velocities which reduce the cyclical angle of attack change and hence produces a more even thrust distribution around the propeller disc. Since the flexure strut 23 of the present invention is relatively stiff within the plane of rotation, it prevents inplane instabilities. It is thus believed that the operation and construction of the above-described invention will be apparent from the foregoing description. While the flexible hub array and method of assembly thereof shown and described has been characterized as being preferred, it will be obvious that various changes and modifications may be made therein without departing from the spirit and scope of the invention as defined in the following claims.

I claim:

1. An improved aircraft propeller assembly for fixed wing aircraft of the type comprising an array of generally vertically oriented propeller blades secured about a generally horizontal propeller drive shaft driven by an engine secured to the wing of an aircraft, wherein the improvement comprises, a beamwise flapping flexure array secured radially about the drive shaft for providing beamwise flapping relative to the drive shaft and providing blade rigidity in radial torsional and inplane directions relative thereto;

a cylindrical hub flexibly mounted to said flexure array symmetrically around said drive shaft;

said hub being mounted to said flexure by a pivot pin joint having a longitudinal axis of symmetry substantially within the plane of rotation of the said flexure array and tangential to a circle drawn in said plane;

said propeller blades being mounted symmetrically to said hub; and said flexures constructed for permitting beamwise flapping of said hub and propeller array in response to generally horizontal wind loading of said propellers.

2. The improved aircraft propeller set forth in claim 1 wherein said beamwise flexure array comprises at least two flexures disposed symmetrically one to the other.

3. The improved aircraft propeller set forth in claim 3 wherein said array of propeller blades comprises at least two propeller blades disposed symmetrically one to the other and symmetrically between said flexures.

4. The improved aircraft propeller set forth in claim 1 wherein said flexures are each constructed with a width substantially greater than its thickness for affording blade beamwise flexibility and substantially greater blades torsional and inplane rigidity.

5. The improved aircraft propeller set forth in claim 1 wherein propeller assembly comprises an array of blade pitch change bearings mounted beneath said propeller array and upon said cylindrical hub for affording blade beamwise flapping thereof.

* * * * *